Sept. 28, 1954  R. MARKLEY  2,690,061
MILK TANK COOLER
Filed April 9, 1951  2 Sheets-Sheet 2
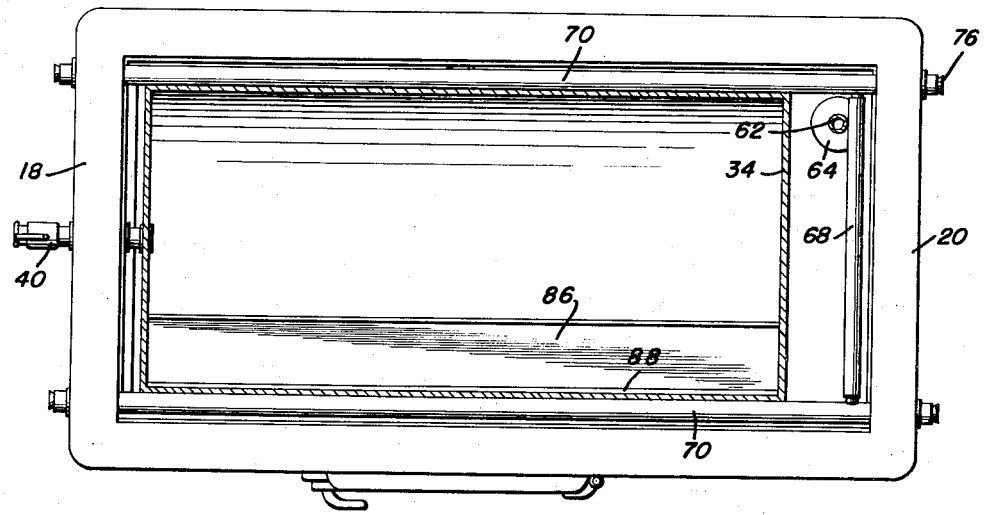
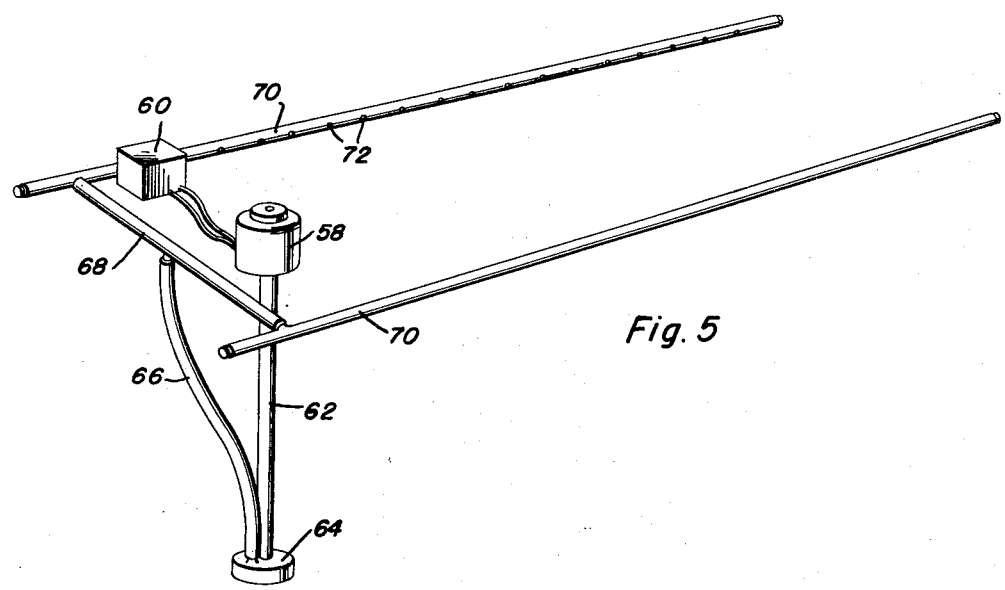
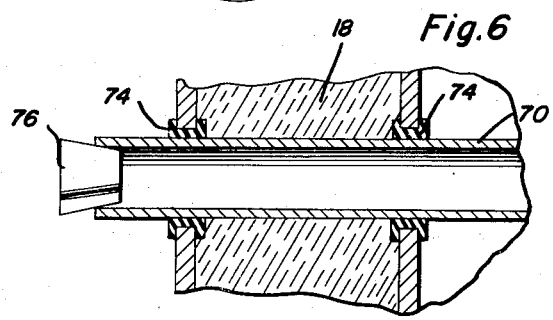
Richard Markley
INVENTOR.

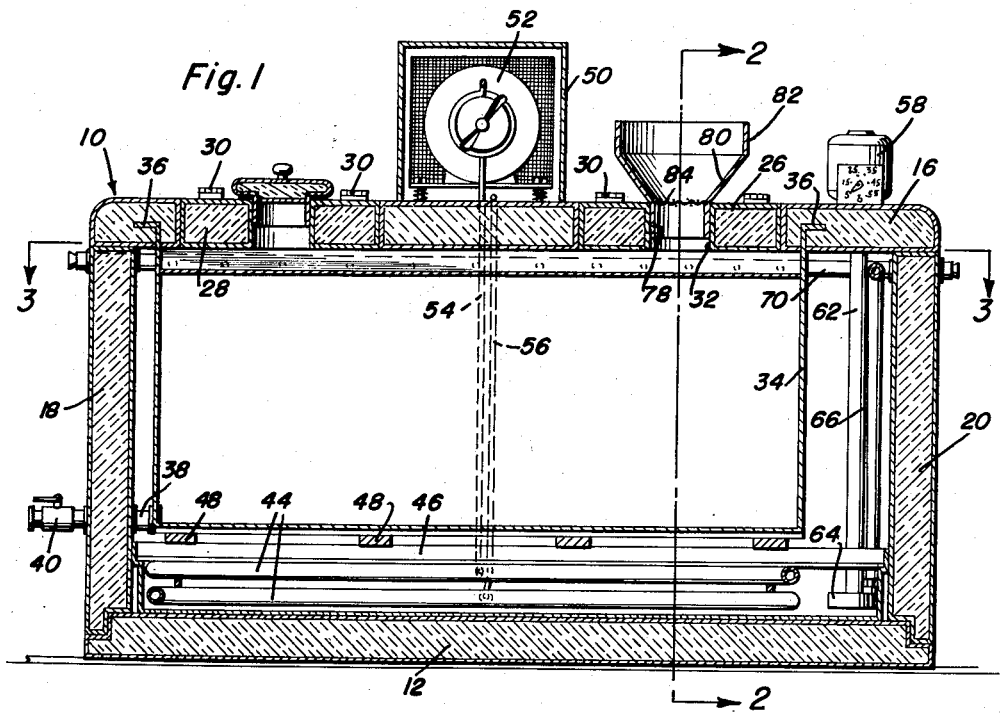

Patented Sept. 28, 1954

2,690,061

UNITED STATES PATENT OFFICE 2,690,061

MILK TANK COOLER

Richard Markley, Madison, Wis., assignor to Dairy Equipment Company, Madison, Wis.

Application April 9, 1951, Serial No. 220,045

4 Claims. (Cl. 62—141)

This invention comprises novel and useful improvements in a milk tank cooler and is similar in subject matter but constitutes improvements over my prior pending application, Serial No. 144,069, filed February 14, 1950, now Patent No. 2,661,607, for Milk Cooler.

The primary object of this invention is to provide a storage receptacle for milk which will not only maintain the stored milk in a hygienic and healthful condition, but will also more quickly chill and lower the temperature of the milk as the same is poured into the tank and before the incoming milk mixes with the contents of the tank.

While the invention set forth in my above identified prior copending application was primarily concerned with cooling and storing the milk in conventional eight- and ten-gallon cans, the present invention relates chiefly to an apparatus for chilling and storing milk in bulk in a relatively large tank. The present invention is of great utility to the dairyman for pouring milk directly from the milking machine bucket in the milk house into the chilling and storage tank of this invention. The present invention can likewise be employed in conjunction with modern type milking parlors, whereby the milk, when taken directly from the cow, may be piped by means of stainless steel pipes directly to the cooling and storage tank of this invention.

In order to satisfactorily store milk in bulk, it is extremely important that the milk shall be brought to the final chilled temperature as rapidly as possible in order to prevent and inhibit any increase in the bacteria content of the same, although it is extremely important that in chilling the milk there shall be no danger of freezing the same and thereby damaging its quality. The use of mechanical agitators to assist in effecting the optimum rate of heat exchange between the incoming, relatively warm milk and the stored chilled milk is more or less widespread but produces a construction which is generally unsanitary and difficult to keep clean.

The primary object of the present invention is to overcome the above-mentioned difficulties and to provide a simple construction of storage tank which shall be of economical construction, easy and inexpensive to maintain in a sanitary condition, which shall greatly increase the ease, certainty and quickness of mixing the incoming milk with the stored milk in the tank for rapidly chilling the incoming milk, and which shall have a greatly improved chilling action upon the incoming milk.

A still further object of the invention is to provide an apparatus as set forth hereinbefore, in which the milk chilling system shall be readily accessible for cleaning and servicing, and shall at least in part be accessible for cleaning exteriorly of the apparatus.

Yet another and essential object of the invention is to provide a milk storage tank in which provision is made for effectively chilling the incoming milk prior to its mixing with the milk already stored within the tank.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a vertical sectional view through a preferred embodiment of this invention, certain parts being shown in elevation, and is taken substantially upon the plane indicated by the section line 1—1 of Figure 2;

Figure 2 is a vertical transverse sectional view through Figure 1, taken substantially upon the plane of the section line 2—2 thereof;

Figure 3 is a horizontal sectional view taken substantially upon the plane indicated by the section line 3—3 of Figure 1;

Figure 4 is an enlarged detail sectional view of a portion of Figure 2, showing more clearly the filling spout and the novel baffle assembly forming an essential feature of this invention;

Figure 5 is a perspective view of the spraying system forming a part of this invention; and Figure 6 is a sectional detail view upon an enlarged scale of a portion of Figure 1 showing the manner in which a conduit of the spraying system extends through the cabinet walls of the device for access from the exterior thereof.

Reference is now made more particularly to the accompanying drawings, wherein like numerals designate similar parts throughout the various views, and which drawings are to be regarded as illustrative merely of one satisfactory manner in which the principles of this invention may be satisfactorily utilized.

Indicated in Figures 1 and 2 is an insulated cabinet of any suitable construction and which may be similar to that set forth in my above identified copending application. This cabinet will include the customary insulated cabinet walls consisting of a bottom wall 12 mounted upon the usual supporting cleats 14, a top wall 16, end walls 18 and 20, together with front and back walls 22 and 24. The top wall 16 may be provided with the customary service or access openings or doors 26 and 28 which may be hinged to the top wall as by hinges 30.

One of these closures, such as that indicated at 26, is provided with a suitable opening or aperture 32 constituting the means by which milk may be introduced into a storage tank 34 of any suitable material and which is anchored in and supported by the top wall 16, as by having the upper ends of the walls of the tank 34 provided with laterally, outwardly extending flanges 36 suitably embedded or anchored in the top wall.

It will now be apparent that the inlet to the tank is closed by the top wall except for the access openings 26 or 28 and the apertures therethrough.

As shown clearly in Figures 1 and 2, the storage tank 34 depends from the top wall and is disposed within the cabinet 10 in spaced relation to the end, sides and bottom wall of the same. This space thus provided between the storage tank and the cabinet walls is utilized for cooling and chilling the tank as set forth hereinafter.

In the above described embodiment, the tank 34 is fixedly secured to and is carried by and closed by the cabinet top 16 for removal therewith. However, it is also feasible, and in some instances preferable to utilize the principles of this invention in a modified construction wherein the tank may be readily removed from the cabinet structure for cleansing, servicing and other purposes.

Milk is discharged from the tank by means of a delivery conduit 38 which extends through a side wall of the tank adjacent the bottom wall thereof, extends through an end wall of the cabinet as that at 18, and is provided with a manually operated discharge valve 40. Needless to say, this conduit has a fluid-tight sealed engagement with the walls of the tank 34 and the cabinet 10.

Suitably disposed in the bottom of the cabinet 10 is a tray 42 which serves both to receive the cooling water by means of which the tank is chilled and maintained at a satisfactory temperature for storing milk, houses the refrigerating coils of a conventional automatic water refrigerating system, and supports, by means of the longitudinal members 46 and the transverse members 48, the lower or bottom wall of the tank 34.

The automatic refrigerating system may be of any conventional and known design, and since the present invention is not limited to any particular type of conventional refrigerating system, further explanation of the details of the same is believed to be unnecessary. However, such system may conveniently include a casing or housing 50 which may be mounted upon the top wall 16 of the cabinet for housing therein a known form of motor compressing unit, indicated generally by the numeral 52, and which is operatively connected, as by means of conduits 54 and 56 with the refrigerating coils 44 for automatically circulating refrigerant therethrough and maintaining these coils at the desired temperature for proper heat exchange purposes with the cooling liquid within the cabinet.

It is contemplated that water or, if desired, some other cooling agent, will be maintained in the pan or tray 42 at a sufficient depth to immerse the coils 44 whereby the water will be maintained at a requisitely low temperature for chilling and refrigerating the milk within the tank 34.

A spraying system is provided for automatically withdrawing the chilled water from the tray 42, spraying the same against the side walls of the tank 34 adjacent the upper ends of the same, in order to chill the tank and its contents. This spraying system preferably includes a circulating motor-driven pump unit, indicated generally by the numeral 58, and which may be conveniently mounted upon the top wall 16 of the cabinet, this motor pump unit being controlled by any automatic thermally responsive, time controlled, or other control member indicated generally by the numeral 60, which is of a conventional design, and which is therefore not further illustrated or described in this application. A suction or inlet conduit for the motor unit 58, consisting of a pipe 62, extending through a tubular housing 63 from the motor 58, through the cabinet top wall 16 and to a pump housing 64 disposed adjacent the bottom of the tray 42, is a pump drive shaft, not shown. The pump unit 64 is provided with a discharge conduit 66 of any suitable type, whereby refrigerated water from the tray 42 may be driven through the conduit 66 by the pump 64 and delivered into a transversely extending branch conduit 68. As shown best in Figure 5, the conduit 68 at its opposite ends is connected to lateral inlet openings of a pair of parallel spray conduits 70.

Throughout the specification the term "conduits" has been employed. It is to be understood that this term is intended in its broadest sense and is not to be limited to a pipe or enclosed passage, since the invention comprehends all liquid conveying means such as troughs and the like.

The conduits 70, as shown in Figures 2 and 4, extend on opposite sides of the side walls of the tank 34 in close proximity to the upper end of the same. These conduits 70 are provided with spraying nozzles 72 which may be in the form of apertures in the conduit or may be provided with nozzles if desired, these outlet openings being positioned at such an angle as to direct the cooling water downwardly upon the adjacent exterior walls of the tank 34, as clearly shown by Figure 4. Thus, the refrigerating water drawn up and sprayed out by the water circulating system is directed upon the top portion of the side walls of the tank along the width or length of the same and closely adjacent the top wall of the cabinet. Thus, the utmost cooling effect is imparted to the upper portion of the tank side walls while the remainder of the tank is cooled by the cooling water running down the exterior sides of the same.

As shown more clearly in Figures 1 and 6, the conduits 70 extend through the two end walls 18 and 20 of the cabinet 10 and are provided with suitable fluid-tight seals 74 for sealing these joints against leakage. The opposite ends of the conduits 70 thus extend exteriorly of the tank and are provided with removable closures, as indicated at 76. The closures 76 may comprise corks, similar closure members, or may consist of screw threaded plugs or caps if desired. The purpose of this construction is to permit ready access to the interior of the spray conduits from the exterior of the cabinet for cleaning the interior of these conduits, as by passing cleaning brushes or the like therethrough, to thus clean the conduits and their spray nozzles 72.

The essential feature of this invention is to chill and cool the relative warm incoming milk discharged into the tank before the latter mixes with the chilled milk stored in the tank to thereby more quickly bring the fresh milk as well as the stored milk to the desired refrigerated temperature for storage. For this purpose, the opening 32 is provided with a removable filler spout consisting of a tubular discharge neck 78 which is slidably received with a snug fit in the upper end of the sleeve or aperture 32, and which is provided with a funnel-shaped, upwardly flaring portion 80 having a rim 82. Within the funnel and preferably between the funnel and the neck 78 there is provided a screen or strainer mesh 84. By this construction, the warm milk may be discharged from the milk pails or any other source into the funnel and will be strained as the same passes directly into the interior of the tank. The filling spout may thus be readily removed for servicing, cleansing, sterilizing and the like, as desired.

A deflector baffle in the form of a plate 86 is fixedly secured within the tank 34.

The deflector 86 may be of stainless steel or any other suitable material, and is disposed as a baffle between the lower or discharge ends of the neck 78 and aperture 32 and the bottom portion of the tank 34. This deflector, as shown in Figures 1 and 3, extends across the entire length of the tank 34 and has its upper end welded or otherwise fixedly secured to the top wall 16 upon its inner surface and immediately adjacent the aperture 32 and neck portion 78 of the filling spout, as shown in Figure 4. From this opening, the baffle or deflector is inclined downwardly and laterally and has its lower end 88 disposed in closely spaced relation to the inner surface of the side wall of the tank 34 and also proximate to the spray conduits 70 disposed upon the exterior surface of the side wall of the tank. There is thus provided a relatively narrow throat or slot between the bottom or discharge end of the deflector or baffle 88 and the side wall of the tank 34, which slot extends the full length of the side wall of the tank.

The function of this construction and of the slot is to cause the raw milk poured through the filling spout to be discharged and spread across the entire length or width of the side wall of the tank and flow down the same in a relatively thin film or stream and in intimate heat exchange relationship with the chilled side wall of the tank.

It is comprehended that the maximum chilling and heat exchange relationship will be effected between the cooling water spray and the relatively warm, incoming milk by causing both the cooling water and the milk to both flow downwardly upon the relatively thin metallic side wall of the tank. Thus, the incoming milk is effectively chilled prior to its discharge into the stored milk within the tank.

Further, the incoming milk descending upon one side of the tank will tend to produce a turbulence within the contents of the tank, producing a better mixing of the incoming milk with the stored milk, and thereby further facilitating the rapid chilling of the fresh milk.

It will be recognized that although but a single baffle 86 has been disclosed, the principles of this invention are readily applicable to various baffling systems and arrangements for distributing the relatively warm incoming milk over chilled surfaces prior to their admixture with the stored milk within the tank.

In their broadest aspects, the principles of this invention comprehend other milk distributing means than a baffle or several baffles. It is merely essential that the large mass of milk deposited into the inlet spout 80 shall be diffused and spread as a thin film over the tank wall to facilitate the rapidity of its chilling. Troughs, spray pipes and various other agents can be used in lieu of the baffle to effect this purpose.

Since, from the foregoing, the construction and advantage of this milk tank cooler are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. A milk cooler including a storage tank having a wall, means for cooling the exterior of said wall, a filling spout in said tank, a baffle in said tank directing milk from said spout into contact with said wall for chilling milk during its passage into said tank, said cooling means comprising a cold water circulating system including means spraying water against the exterior surface of said tank, a cabinet inclosing said tank and cooling means, said spraying means including conduits having spray nozzles, said conduits extending through the walls of said cabinet in sealed engagement therewith, means detachably closing opposite ends of said conduits for obtaining access thereinto from exteriorly of said cabinet for cleaning the same.

2. A milk cooler including a cabinet having a cooling chamber therein, a storage tank removably disposed in said chamber and having side and bottom walls in spaced relation to the side and bottom walls of the chamber, a top on said tank forming a removable cover for said cabinet, means in said chamber for cooling the exterior of the walls of said tank, a filling spout in said tank, a baffle in said tank directing milk from said spout into contact with the side wall of said tank for chilling said milk during its passage into the tank, said baffle comprising a flat plate having a horizontal upper edge secured to the top wall of the tank and having its side edges secured to the side wall of the tank.

3. A milk cooler including a cabinet having a chamber therein and a removable top for said chamber, a storage tank loosely receivable in said chamber and fixedly secured to and supported by said top for removal therewith, means in said chamber for cooling said tank, said cooling means including conduits disposed at the exterior of the tank wall and having spray nozzles for directing coolant against said walls, said conduits being supported solely by the wall of said cabinet.

4. A milk cooler including a cabinet having a chamber therein and a removable top for said chamber, a storage tank loosely receivable in said chamber and fixedly secured to and supported by said top for removal therewith, means in said chamber for cooling said tank, said cooling means comprising a cold water circulating system including means spraying water against the exterior surface of said tank, said spraying means including conduits having spray nozzles, said conduits extending through the walls of said cabinet in sealed engagement therewith, means detachably closing opposite ends of said conduits for obtaining access thereinto from exteriorly of said cabinet for cleaning the same.

References Cited in the file of this patent

UNITED STATES PATENTS

| Number | Name | Date |
| --- | --- | --- |
| 751,168 | Hadley | Feb. 2, 1904 |
| 2,119,631 | Edwards | June 7, 1938 |
| 2,249,036 | Peters | July 15, 1941 |
| 2,425,519 | Duncan | Aug. 12, 1947 |
| 2,557,252 | Bannister | June 19, 1951 |